GUSTAVUS H. WRIGHT.

Cane Stubble Hoe.

No. 120,143.  Patented Oct. 17, 1871.

UNITED STATES PATENT OFFICE.

GUSTAVUS H. WRIGHT AND AMORY K. JOHNSON, OF NEW ORLEANS, LOUISIANA.

IMPROVEMENT IN CANE-STUBBLE HOES.

Specification forming part of Letters Patent No. 120,143, dated October 17, 1871.

*To all whom it may concern:*

Be it known that we, GUSTAVUS H. WRIGHT and AMORY K. JOHNSON, of New Orleans, in the parish of Orleans and State of Louisiana, have invented a new and useful Improvement in Stubble Cane-Hoe; and we do hereby declare that the following is a full, clear, and exact description thereof, which will enable others skilled in the art to make and use the same, reference being had to the accompanying drawing forming a part of this specification.

The ordinary plantation-hoe, although extensively used, is not well adapted for the cultivation of sugar-cane when the latter is in the condition known as stubble-cane, and our object in the present invention is to furnish an implement every way calculated for that purpose; and it consists in a hoe with three (more or less) broad tines, and with a cutting-edge on the opposite end, the construction and arrangement of parts being as hereinafter more fully described.

Figure 1:
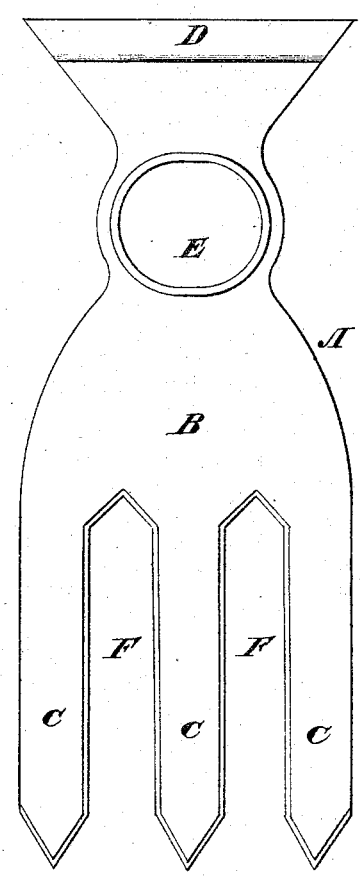
Figure 2:
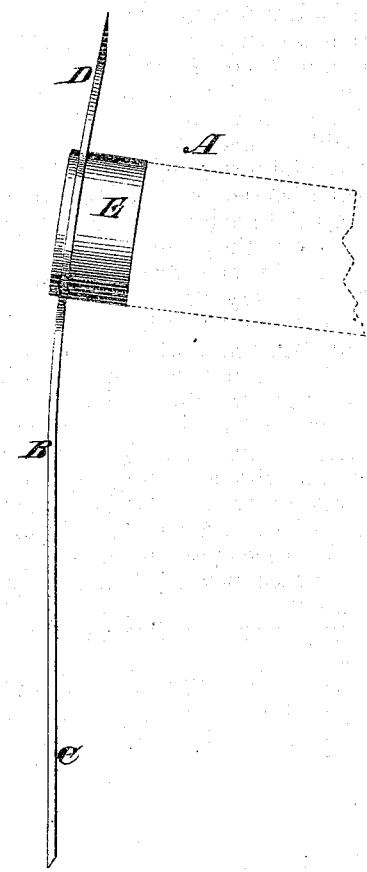

In the accompanying drawing, Figure 1 is a front or face view of the hoe, and Fig. 2 is an edge view.

Similar letters of reference indicate corresponding parts.

A is the hoe, consisting of the plate B and tine C, cutting-edge D, and eye E. The eye E may be formed in any manner to make the hoe durable and strong. The plate B of the hoe, below the edge to the end of the teeth, is longer than the ordinary hoe, and is whole or entire for nearly half that length. The teeth or tines C are formed by cutting out portions of the plate, as indicated at F F, leaving the tines C of about the same width as the portions cut out, as represented in the drawing. The ends of the teeth are beveled to a point. The cutting-blade D is above the eye, of any desired width and length, it being an elongation of the plate B, beveled to an edge, which adapts the hoe for cutting weeds and similar purposes.

Stubble-cane requires a peculiar system of culture and peculiar implements to cultivate it to the best advantage. This hoe is perfectly adapted to the purpose, and meets a want which has long been felt by sugar-planters.

Having thus described our invention, we claim as new and desire to secure by Letters Patent—

As a new and improved article of manufacture, the hoe A, consisting of the plate B, teeth or tines C, eye E, and cutting-blade D, arranged substantially as and for the purposes described.

GUSTAVUS H. WRIGHT.
AMORY K. JOHNSON.

Witnesses:
OWEN RIEDY,
H. B. GORDON.